United States Patent
Ramamurthy et al.

(10) Patent No.: US 11,989,112 B2
(45) Date of Patent: May 21, 2024

(54) MODEL VALIDATION BASED ON SUB-MODEL PERFORMANCE

(71) Applicant: CERNER INNOVATION, INC., North Kansas City, MO (US)

(72) Inventors: Uttam Ramamurthy, Bangalore (IN); Ashwin Chhetri, Darjeeling (IN); Pankaj Saxena, Pune (IN); Rahul Jain V, Bangalore (IN)

(73) Assignee: Cerner Innovation, Inc., Kansas City, MO (US)

(*) Notice: Subject to any disclaimer, the term of this patent is extended or adjusted under 35 U.S.C. 154(b) by 0 days.

(21) Appl. No.: 17/811,787

(22) Filed: Jul. 11, 2022

(65) Prior Publication Data

US 2023/0205668 A1 Jun. 29, 2023

Related U.S. Application Data

(60) Provisional application No. 63/294,533, filed on Dec. 29, 2021.

(51) Int. Cl.
*G06F 11/34* (2006.01)
*G06F 9/445* (2018.01)
*G06N 20/00* (2019.01)

(52) U.S. Cl.
CPC ...... *G06F 11/3495* (2013.01); *G06F 9/44505* (2013.01); *G06F 11/3428* (2013.01); *G06N 20/00* (2019.01)

(58) Field of Classification Search
CPC ............ G06F 9/44505; G06F 11/3428; G06F 11/3495; G06N 20/00
See application file for complete search history.

(56) References Cited

U.S. PATENT DOCUMENTS

| | | | |
|---|---|---|---|
| 10,719,301 B1 | 7/2020 | Dasgupta et al. | |
| 2019/0325995 A1* | 10/2019 | Malone | ................ G16H 40/20 |
| 2020/0344185 A1 | 10/2020 | Singaraju et al. | |
| 2021/0065053 A1 | 3/2021 | Higgins et al. | |
| 2021/0117869 A1 | 4/2021 | Plumbley et al. | |
| 2021/0375392 A1 | 12/2021 | Polcari et al. | |
| 2022/0198320 A1* | 6/2022 | Walczyk, III | ........... G06F 18/23 |
| 2023/0169395 A1* | 6/2023 | Pogde | .................... G06N 20/00 706/12 |
| 2023/0177369 A1* | 6/2023 | Hamilton | ............... G06N 20/00 706/12 |

* cited by examiner

*Primary Examiner* — Thomas J Dailey
(74) *Attorney, Agent, or Firm* — Invoke (57) ABSTRACT

Methods, systems, and computer-readable media are disclosed herein for a concurrent comparative tool for assessing sub-models of a data model pipeline in a deployed or pre-deployment environment. The tool may compute a plurality of performance measures that quantitatively assess the performance of each sub-model in the data model pipeline based on a configuration file that facilitates validation of the technological performance and predictive accuracy of the sub-model. Additionally, multiple versions of a sub-model deployed in similar data model pipelines, or in a pre-deployment environment, may be comparatively evaluated. A leading version of the sub-model may be identified and deployed.

34 Claims, 9 Drawing Sheets

```
{
    "use_case": "UseCase",
    "client": "Client",
    "entity_type": "DimensionType",
    "entity_value": "DimensionValue",
    "start_date": {
      "year": 2021,
      "month": 12,
      "day": 8,
      "hour": 6,
      "minute": 36
    },
    "end_date": {
      "year": 2021,
      "month": 12,
      "day": 31,
      "hour": 6,
      "minute": 36
    },
    "compute": {
      "metrics": { },
      "violations": { }
      "drifts": {
        "scripts": {
          "preprocessing": "<s3 path>"
        },
        "config": {
          "statistics_uri": {
            "Model_A": "<s3 path>",
            "Model_B": "<s3 path>",
            "Model_C": "<s3 path>",
            "Model_D": "<s3 path>",
          }
        }
      }
    },
    "return_data": true,
    "result_bucket": "<s3 bucket>",
    "result_key": "<s3 Prefix>"
}
```

702 — start_date block
704 — compute block
706 — return_data block
710 — metrics
712 — drifts

FIG. 7.

```
"metrics": {                                               7010              "drifts":{                                      7012
  "do_metrics": true,                                                          "do_drifts": true,
  "do_alert": true,                                                            "do_alert": true,
  "scripts": {                                                                 "scripts": {
    "preprocessing": "path/pre_processing.py",                                   "preprocessing": "path/pre_processing.py",
    "postprocessing": "path/post_processing.py"                                  "postprocessing": "path/post_processing.py"
  },                                                                           },
  "config": {                                                                  "config": {
    "metric_params": {                                                           "statistics_uri".{
      "metric": ["mape", "mae", "rmse", "r2"],                                     "Model_A": "path/statistics.json"
      "aggregated": false                                                          "Model_B": "path/statistics.json"
    },                                                                           }
    "alert_params": {                                                          .
      "sns_topic": "",                                                         .
      "region": "us-west-2",                                                   .
      "add_metrics_thresholds": false,
      "metrics":                                                                                                              7014
      {
        "metric": "mae", "min": null, "max": 0.961, "subtype": ["INPT"]
      },
      {
        "metric": "mae", "min": null, "max": 1.327, "subtype": ["ED"]        "rule": [
      }                                                                        {
    }                                                                            "feature": "Numeric_Feature_A",
  },                                                                             "common": {
  "query_params" { ←—708                                                          "num_present":198,
    "database": "VolumePrediction",                                                "num_missing": 4
    "actuals_table": "Actual",                                                   },
    "predictions_table": "Prediction",                                           "numerical_statistics": {
    "location_cd": "999999",                                                       "min": 6.4,
    "col_names": {                                                                 "max": 7159.8,
      "execution_date_time": "executiondatetime",                                  "percentile_25": 8.5,
      "alias": "alias",                                                            "percentile_95": 186.5,
      "value_number": "value",                                                     "std_dev": 843.159,
      "applies_start_str": "applies_at",                                           "mean_absolute_deviation": 59.415,
      "insight_version", "insight_version",                                        "median_absolute_deviation": 6.5,
      "actual_version": "actual_version"                                           "iqr_threshold": 8.5,
    },                                                                             "iqr_lower_limit": -1.2,
    "max_prediction_interval": "24H"                                               "iqr_upper_limit": 89.0
  },                                                                             }
  "data_params": {    ←—714                                                    },
    "round_hours": "floor",                                                    {
    "interval_freq": "1H",                                                       "feature": "Categorical_Feature_B",
    "inpatient_locs": [],                                                        "common": {
    "ed_locs": [],                                                                 "num_present": 356,
    "pred_dict": {                                                                 "num_missing": 4
      "ER": "ED",                                                                },
      "INPATIENT": "INPT:                                                        "categorical_statistics": {
    }                                                                              "is_contained_in": [
  }                                                                                  "Value_A",
.                                                                                    "Value_B",
.                                                                                  ],
.                                                                                  "value_frequency": {
                                                                                     "Value_A": 389,
                                                                                     "Value_B": 198,
                                                                                   }
                                                                                 }
```

MODEL VALIDATION BASED ON SUB-MODEL PERFORMANCE

This non-provisional patent application claims priority benefit to provisional patent application No. 63/294,533, entitled "Multi-Model Health Monitoring," filed on Dec. 29, 2021, the entirety of which is incorporated by reference herein. This non-provisional application filed at the United States Patent and Trademark Office is related to non-provisional application Ser. No. 17/811,781,entitled "System and Method for evaluating and deploying Data Models having improved Performance Measures," filed on Jul. 11, 2022 and co-pending non-provisional application Ser. No. 17/811,765 entitled "System, methods, and processes for Model Performance Aggregation," file on Jul. 11, 2022, both filed contemporaneously with this non-provisional application, the entirety of which is incorporated by reference herein.

TECHNICAL FIELD

This application relates to machine-learning data models. More particularly, to comparative evaluation of prediction accuracy and performance measures of distinct versions of a machine-learning data model.

SUMMARY

Embodiments of the present disclosure relate to, among other things, methods, systems, and computer-readable media for computationally evaluating sub-models of a machine-learning data model (hereinafter "model") pipeline for technological performance and/or predictive accuracy. Some embodiments also include deploying a version of a sub-model having demonstrated improvements to the technological performance and/or predictive accuracy relative to a currently deployed version of the sub-model. As will be described, aspects of the invention discussed hereinafter monitor and comparatively evaluate technological performance and/or predictive accuracy by monitoring multiple sub-models of a model pipeline.

A first embodiment may include a computerized method for evaluating and improving sub-model performance and accuracy. The computerized method may include detecting output from a model pipeline including at least two of sub-models, wherein the output of the model pipeline includes one or more predictions computed based on the at least two sub-models. The computerized method may also include retrieving one or more files containing formatted datasets corresponding to the model pipeline, wherein the formatted data includes the data used to generate the prediction as well as the one or more predictions and receiving a configuration file. Additionally, the computerized method may include computing a plurality of sub-model performance reports from the plurality of datasets, based on the configuration file, wherein each of the at least two sub-model-performance reports includes a plurality of performance metrics determined for the corresponding version of the model.

Another embodiment may include a system for monitoring a plurality of sub-models of a model pipeline. The system may include a data model performance monitoring system that, via one or more processors executing a script. The script may include operations that facilitate receiving at least one of dataset corresponding to a plurality of sub-models of a model pipeline, wherein the at least one dataset includes metadata corresponding to a prediction and predictive data for each of the plurality sub-models of the model pipeline; executing operations defined by a configuration file corresponding to the model pipeline that includes compute instructions for a plurality of sub-model performance measures; and outputting the plurality of sub-model performance measures as reports for each of the sub-models, based on the configuration file.

Another embodiment may include a method for monitoring a plurality of models deployed within a model pipeline. The method may generate one or more predictions and one or more model features using each model within the plurality of models and identify a performance measure threshold for each model within the plurality of models. Further, the method may generate a model report for each model within the model pipeline using the performance measure threshold for each model within the plurality of models and based on the model reports generated, generate a health score for each model within the plurality of models. Additionally, the method may generate a model pipeline health score based on the generated health scores.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims as supported by the Specification, including the Detailed Description.

BRIEF DESCRIPTION OF THE DRAWINGS

The present systems and methods for learned feature vectors for single and across sensor object tracking are described in detail below with reference to the attached drawing figures, wherein:

FIG. 7A depicts example code snippets of a configuration file to facilitate computing sub-model performance measures, in accordance with some embodiments of the present disclosure.

DETAILED DESCRIPTION

At a high level, computer models may be trained to predict outcomes (e.g., compute a future event based on current data) and/or perform tasks (e.g., trigger some action by a downstream system or device based on data computation). In many situations, an overall model includes multiple sub-models that make predictions or perform tasks that contribute to the overall predictive or task output. Traditionally, once the sub-models are trained with training data the model pipeline is built and deployed. Once a model pipeline is deployed, the model pipeline may be cumulatively evaluated to validate that the model pipeline is performing within the desired performance measures. However, in contrast to conventional approaches of model pipeline performance detection, the aspects described herein provide sub-model level quantitative and/or qualitative performance reporting. The performance measures may be communicated for supervised assessment and/or may be automatically acted on by the described system.

Accordingly, the embodiments described herein facilitate the computing of individual sub-model performance measures (e.g., metrics, drift, bias, and/or violations) in a model pipeline including multiple sub-models. In order to accomplish this, the system uses a data set (e.g., an insight) to track sub-model operations. Generally, the datastore captures the sub-model(s) output (e.g., predictions) and the sub-model(s) input (e.g., data consumed by the sub-model(s) corresponding to the features of the sub-model). The sub-model(s) input may be captured in a pre-encoded (e.g., prior to transformation to sub-model readable data) and/or post-encoded (e.g., after transformation to sub-model readable data) format. For example, the sub-model(s) input may be captured prior to, and/or after, natural language processing, dimensionality reduction, vectorization, or any other suitable data conversion that facilitates data ingestion by a sub-model. Similarly, sub-model output may be captured in an encoded or decoded format. For example, where output of a first sub-model (e.g., sub-model$_A$ 104 of FIG. 1) is input of one or more second model(s) (e.g., sub-model$_B$ 106 of FIG. 1), the datastore may capture the data as outputted and/or as configured for input in the second sub-model(s). In at least one embodiment, the sub-model data is captured in an object-oriented file (e.g., an insight file) in the form of metadata in a programmatically defined schema. The schema may facilitate the identification The system can be configured to compute one or more performance measures as for sub-models of a model pipeline continuously, periodically, intermittently, and/or on demand. In some embodiments, the system may monitor a location where the model pipeline output is stored or may monitor a system downstream of the model pipeline that acts upon the output. For example, in response to deposit of an output from the model pipeline (e.g., model pipeline prediction 110 of FIG. 1) the system may extract the data associated with the one or more sub-models held in the datastore. An automatically executed pre-processing script may load one or more configuration files and one or more compute dictionaries in a reporting component of the system. The reporting component transforms the data stored in the datastore based on the one or more configuration files. Additionally, the script may pull all the input data and segregate the data based on the sub-model.

Definitions

As used herein, the terms "observed data", "ground truth", "actuals", and "targets" are used interchangeably to refer to empirical data and/or observed real-world information encoded as data. For example, observed data includes measured, captured, or recorded values representing and/or quantifying an event or a variable for an outcome that has occurred. In one example, observed data includes a value for a total patient volume of a specific healthcare entity that occurred over a defined six month time period, as recorded in historical reporting data of the healthcare entity.

As used herein, the term "predictive data" refers to any and all data that is input to and output from a version of a data model. For example, predictive data can include input(s) such as training datasets that are ingested to generate and trigger output. Additionally or alternatively, predictive data can include output(s) generated or produced from the data model version, such as prediction(s) made by that the version of the data model using the input(s). Predictive data can also include metadata related to the data model, metadata related to the data version of the data model, metadata related to the sub-model input, and/or metadata related to the sub-model output. Predictive data can refer to other output of the data model version.

As used herein, the terms "model" and "data model" are used interchangeably to refer to a machine learning/artificial intelligence type of data model that is defined by algorithmic decision logic. A data model (and any version thereof) can include features such as decision logic, computational layers, neural networks, Markov chains, weighting algorithms (specific or non-specific to variables, values, layers, sub-models), and/or Random Forests. Although referred to in the singular, it will be understood that a data model (and any version thereof) can include a plurality of specific sub-models that operate together in a particular sequence or in parallel, for example, that contribute to output such as predictions.

As used herein, a "version", "sub-model version" and a "data model version" are used interchangeably to refer to a particular iteration of a data model having defined configurations for the input, operations of (e.g., decision logic), and/or output that are specific to or unique to that particular iteration.

As used herein, the terms "script" and "computer programming script" are used interchangeably to refer to computer-readable and -executable instructions/programming code that are an expression of instructions that cause, manage, and facilitate performance of a sequence of operational steps by a computer, in an automated or semi-automated manner.

As used herein "performance measures" refer to measurements captured that represent and quantify aspects of the technological performance and prediction accuracy (or inaccuracy) of a model version and/or other behavior. Performance measures can include, for example, metrics, prediction accuracy, bias, data drift, noise, variance, and the like. Examples of metrics include Measured Absolute Percentage Error (MAPE), Mean Absolute Error (MAE), and/or Root Mean Squared Error (RMSE).

EMBODIMENTS

Figure 1:
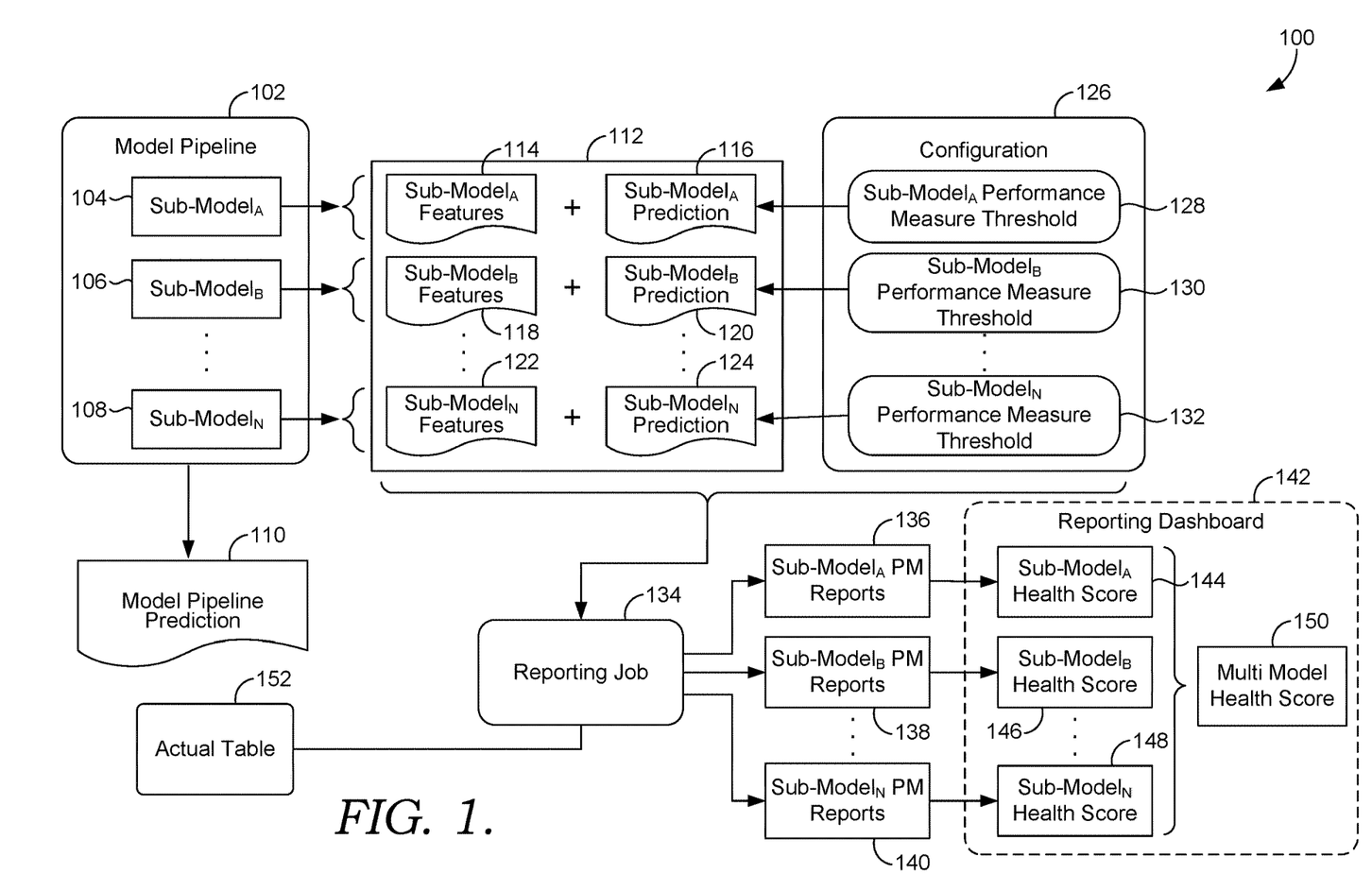
FIG. 1 depicts a process diagram illustrating an example for computing sub-model performance measurements based on a model pipeline, in accordance with some embodiments of the present disclosure.

With reference to FIG. 1, FIG. 1 is an example data flow diagram illustrating example process 100 for computing performance measures of one or more sub-models of a model pipeline. Generally, the process 100 may include a model pipeline 102 generating a model pipeline prediction 110. The model pipeline 102 may receive one or more inputs from one or more data sources (e.g., data cluster 402 of FIG. 4) to compute the model pipeline prediction 110. A data cluster 402 may be a database 152 or multiple databases 152 and 404 that store data that facilitate a chaotic and/or dynamic system. For example, health care or meteorology. In other words, the data may be continuously, intermittently, and/or periodically changed as the patients associated with the data are treated, seen, discharged, or otherwise interact with the institution, care network, or region that maintains the database. The data may be generated by sensors that monitor the patient (e.g., heart rate and/or weight), data about the patient (e.g., admission date and/or demographics), and/or observations about the patient (e.g., diagnosis of disease or condition).

Process 100 may include the output or capture of insights 112 that includes a data record of all the data used to generate the prediction of the sub-model (e.g., 114, 118, and 122) and the prediction itself (e.g., 116, 120, and 124). Insight 112 may format the data used to generate the predictions in a data schema. For example, the model pipeline 102 may include one or more machine learning model(s) (e.g., sub-model$_A$ 104) of a model pipeline 102 generating outputs (e.g., sub-model$_A$ prediction 116). The sub-models (e.g., sub-model$_A$ 104, sub-model$_B$ 106, and sub-model$_N$ 108) may consume different inputs from the data source. For example, sub-model$_A$ 104 may consume data corresponding to the fields of sub-model$_A$ features 114. Sub-model$_B$ 106 may consume data corresponding to the fields of sub-model$_B$ features 118 and sub-model$_N$ 108 may consume data corresponding to the fields of sub-model$_N$ features 122. The data schema for the insight may include sub-model execution metadata (e.g., a time stamp indicating the time the one or more sub-models was executed, a version of the one or more sub-models, and data indicating the identity of the model pipeline associated with the one or more sub-models).

Process 100 may also include a reporting job 134 receiving a configuration file 126 and the insights 112. Generally, a configuration file contains the metadata information required by the monitoring job as well as processing scripts to get the data as well as store the data in a way that it can be easily queried for performance measure computation. Configuration file 126 may include one or more scripts that facilitate the execution of operations that may be required to retrieve/transform/merge/segregate the data identified in insight 112. For example, configuration file 126 may include query parameters (e.g., query_params of code 708 of FIG. 7A) that point to the location of other objects that facilitate extracting data from the insight 112. Similarly, configuration file 126 may include data parameters (e.g., data_params of code 712 of FIG. 7A) that point to objects that facilitate transforming the format of the extracted data to a reporting format. The configuration file 126 may also include one or more scripts that facilitate computing the performance measurements for the one or more sub-models. The performance measurements may include metric measurements, bias measurements, drift measurements, and/or violation measurements amongst others.

A bias measures are generally performance measures that computational quantify the weight and/or representation of data elements based on the training data. As biased data may result in skewed prediction outcomes, detecting bias at a sub-model level may facilitate identification and/or localization of some types of programmatic and/or data errors in a model pipeline.

In calculating the Bias for a model version, predictions from insights features real time data are analyzed using one or more baseline. The baseline may be generated from training data containing features and prediction values. This helps to generate an outcome. This outcome may be a comprehensive report describing the feature level bias progression of data with respect to the baseline over the time.

Pre (evaluates features with actual label) and post (evaluates features with actuals & predictions label values) training bias are supported. For example, once model pipeline data (actual) has been evaluated, the model monitoring system loads a pre-processing file and baseline files into the system and executes the pre-processing algorithm to get the model insight features and actuals. The data are then analyzed with baseline files using bias & configured metrics to calculate any pre-training bias. In another example, once model pipeline data (actual & predictions) has been evaluated, the model monitoring system loads a pre-processing file and baseline files into the system and executes the pre-processing algorithm to get the model insight features and actuals. The data are then analyzed with baseline files using bias & configured metrics to calculate any post-training bias.

Drift measures are generally performance metrics that computational quantify occurrences of unexpected or undocumented changes to the structure or semantics of data consumed by and/or generated by the sub-model. As drift events may corrupt the predictive model or break computational operations, detecting drift at a sub-model level may facilitate identification and/or localization of some types of programmatic deficiencies in a model pipeline.

In an example drift calculation, model features are analyzed with baselines created from the training data. In the exemplary drift calculation, statistical information of model data with respect to the baseline data is retrieved. The drift calculation may then identify any drift present for the features within the model. Additionally, the drift calculation may operate to analyze multiple models with a respective baseline for each model. For multiple models, a baseline file may exist for each model and the features for each model may be mapped to the respective model baseline for each model.

A violation measures when a threshold and/or baseline is violated. For example, the feature of the model version and the particular performance measure for which the violation occurs, the expected value(s) and/or target value(s) of the violated baseline and/or threshold, the value of the performance for which the violation was determined, and the like. Additionally, features within the model or sub-model are analyzed with baselines created from training data. During the analysis of the model, the occurrence of any new features or missing features in the model data are captured. For any valid features in the model data, the data is analyzed with the baseline to capture any datatype mismatch, positive, negative, and non-zero variations or violations.

Generally, a metric measure includes analytical comparisons of the sub-model's predictive reliability. For example, as depicted in FIG. 7A, a configuration file may include a metric of Measured Absolute Percentage Error (MAPE), Mean Absolute Error (MAE), or Root Mean Squared Error (RMSE), or a combination thereof for one or more sub-models. MAPE may be generally expressed in the following example, though other expressions of MAPE are contemplated to be within the scope of aspects discussed herein:

$$MAPE = \frac{100\%}{n} \sum_{t=1}^{n} \left| \frac{A_t - F_t}{A_t} \right| \quad (1)$$

Generally, MAE may be expressed in the following example, though other expressions of MAE are contemplated to be within the scope of aspects discussed herein:

$$MAE = \frac{\sum_{i=1}^{n} |F_i - A_i|}{n} = \frac{\sum_{i=1}^{n} |e_i|}{n} \quad (2)$$

RMSE, generally, is the standard deviation of the prediction error. As such, it may be expressed in the following example, though other expressions of RMSE are contemplated to be within the scope of the aspects discussed herein:

$$RSME = \sqrt{\frac{\sum_{i=1}^{n} (A_i - F_i)^2}{n}} = \sqrt{(f - o)^2} \quad (3)$$

In the example expressions above, A refers to the observed data; F refers to the prediction based on the input data. The configuration file 126 may also include baseline thresholds associated with the performance measurements for each applicable sub-model. For example, as depicted in FIG. 7A, a configuration file may include a maximum value threshold for MAE values of an inpatient sub-model.

The reporting job 134 may compute one or more sub-model performance measure reports (e.g., sub-model$_A$ performance measure report 136) based on insight 112 and the compute library and data formatting instructions included in the configuration file 126. For example, the application of the compute library and data formatting instructions may compute the MAPE, MAE, RMSE, or any other metric measurement applicable to sub-model$_A$ 104 based on the sub-model$_A$ prediction 116 and the corresponding observed data from data source 152.

Process 100 may also include converting one or more sub-model performance measure reports (e.g., sub-model$_A$ performance measure report 136) into a sub-model score (e.g., sub-model$_A$ health score 144). The sub-model score may be computed at two levels. A first level may include comparing the computed performance measurement with the corresponding base line threshold. In some embodiments, a sub-model may "pass" a first level score for where the values computed for the performance metric are below a maximum threshold and/or above a minimum threshold. Similarly, a sub-model may "fail" a first level score for where the values computed for the performance metric are above a maximum threshold or below a minimum threshold. Additionally, a sub-model may be classified as "at risk" for a first level score where the values computed for the performance measure are within a predetermined value of a baseline threshold. For example, as depicted in FIG. 7A, a configuration file associated with the inpatient sub-model may include example code 7010 that sets maximum value threshold for MAE values of an inpatient sub-model. The inpatient sub-model may pass the first level score for MAE when the values computed for MAE by the reporting job 134 are below the MAE maximum baseline threshold. The configuration file may also include example code 7012 and 7014 that sets drift measures parameters and processing.

A second level of sub-model score may include a quantitatively computed representation of the sub-models in the model pipeline (e.g., multi model health score 150). For example, a second level score may comprise the total number of performance measures passed compared with the total number of performance measures computed for the sub-model. Where the percentage of the passed performance measures is above a predetermined value, the sub-model may pass the second level score. In some embodiments, where the total number of passed performance measurements are below the predetermined value but above a secondary value, the sub-model may be identified as "at risk". Similarly, where the total number of passed performance measurements are below the secondary value, the sub-model may be identified as "failed". Some embodiments may compute second level sub-model scores for one or more classes of performance measurement (e.g., metric measurements, bias measurements, drift measurements, violation measurements).

In some embodiments of process 100, the sub-model scores may be reviewable by an interface (e.g., interface 300 of FIG. 3) of reporting dashboard module 142. The interface may present an ordered visual representation of the first level and/or second level sub-model health scores. For example, the sub-model$_A$ health scores 144, the sub-model$_B$ health scores 146, and/or the sub-model$_N$ health scores 148 may be summarized for each class of performance measure (e.g., metric, drift, bias, violation) in a first portion of interface 300. For another example, the individualized sub-model$_A$ health scores 144, the sub-model$_B$ health scores 146, and/or the sub-model$_N$ health scores 148 may be accessible by interaction with elements of the interface 300.

Additionally, or alternatively, some embodiments of process 100 include automatically replacing a sub-model with a different version of the sub-model based on the relative health scores of each sub-model. The monitoring dashboard module 142 may determine one leading version of a sub-model based on the performance measure data in the performance reports and/or health scores. For example, a plurality of scores for different versions of the same sub-model (e.g., a first version of sub-model$_A$ and a second version of sub-model$_A$) incorporated into desperate model pipelines may be compared via monitoring dashboard module 142. The leading version of the sub-model may be identified and selected autonomously. For example, where the leading version has demonstrated improved performance measures and/or superior prediction accuracy relative to at least one other version of the sub-model in view of the system-driven comparisons of the various performance measures in the sub-model performance scores. The leading version may alternatively be selected semi-autonomously by replying on user input, such as a manual user selection of the leading version from a list and/or a user confirmation of the system's recommended leading version. The system can then perform and/or trigger deployment of the leading sub-model version.

Figure 2:
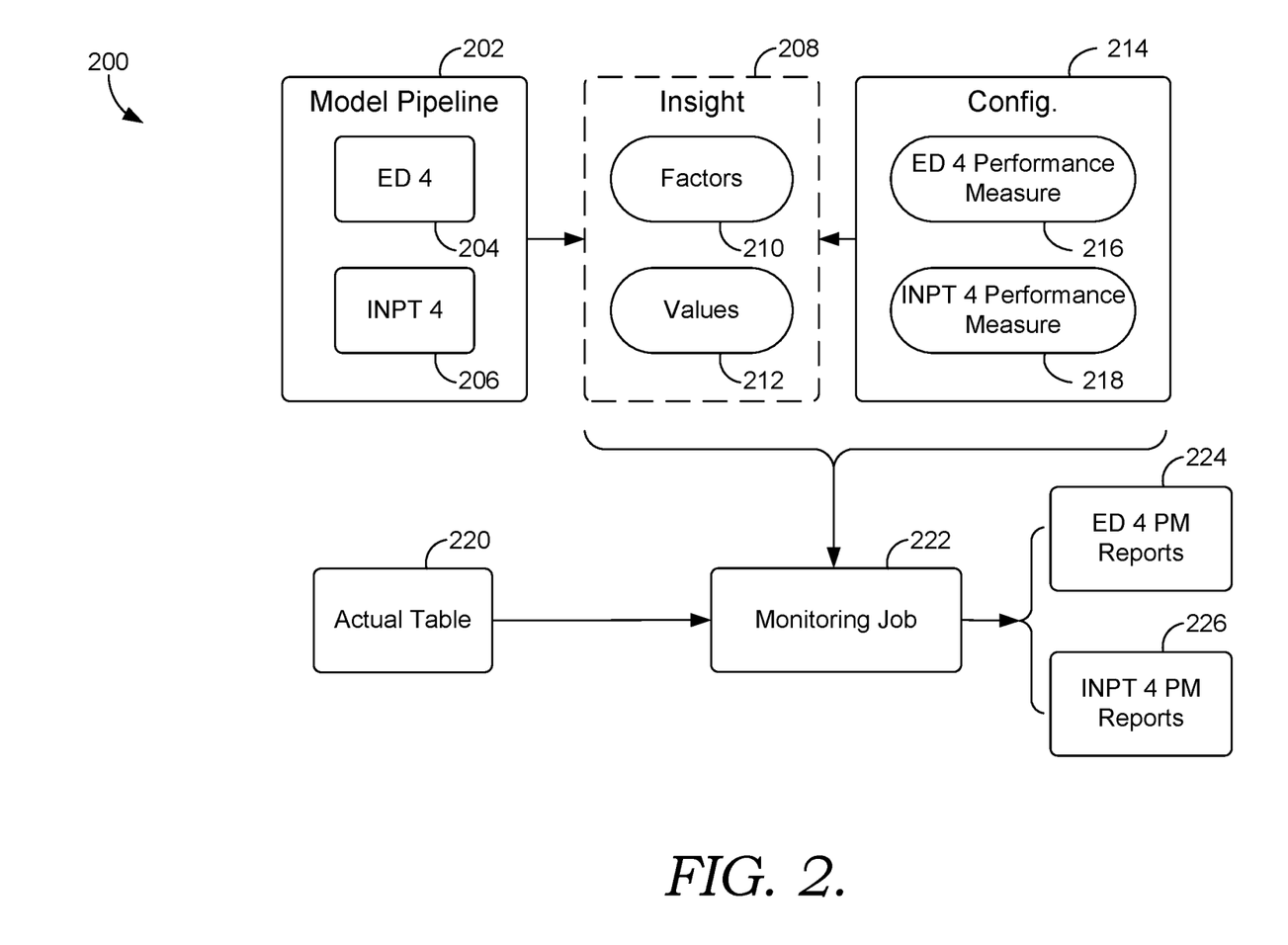
FIG. 2 depicts another process diagram illustrating an example for computing sub-model performance measures based on a model pipeline, in accordance with some embodiments of the present disclosure.

Turning to FIG. 2, FIG. 2 depicts an example prediction model process 200 including a hospitalization prediction model pipeline 202, in accordance with embodiments described herein. The hospitalization prediction model pipeline 202 may consume data from a data cluster 402 of FIG. 4 to compute predictions of the total patient in-take of a hospital for the next 12 hours, 24 hours, 36 hours, and 72 hours. To facilitate the overall predictions, hospitalization prediction model pipeline 202 may include one or more emergency prediction sub-models 204 and one or more inpatient prediction sub-models 206, amongst others. The one or more emergency prediction sub-models 204 may consume a plurality fields in one or more databases of data cluster 402 of FIG. 4 to predict emergency admissions for the next 12 hours, 24 hours, 36 hours, and 72 hours. Similarly, the one or more inpatient prediction sub-models 206 may consume a plurality fields in one or more databases of data cluster 402 of FIG. 4 to predict non-emergent admissions for the next 12 hours, 24 hours, 36 hours, and 72 hours.

As depicted, the process 200 includes generation of insight 208 as an output of model pipeline 202. The insight 208 may be an object file (e.g., a JavaScript Object Notation file) that captures metadata about the model pipeline 202 and the emergency sub-model(s) 204 and inpatient prediction sub-model(s) 206. For example, the insight 208 may capture factors 210 and values 212. The factors 210 may be programmatic expressions in the object file that identify metadata that represents amongst others, the identity of the model pipeline 202, the identity of sub-model(s), a time that the model initiated, and the output of the sub-model(s). The values 212 may be metadata that represents amongst others, the features (e.g., other objet files, database fields, etc.) that are consumed by the sub-model(s) and the properties of the features. In some embodiments, insight 208 or another insight may capture metadata that represents, data similar to that described above for the observed data corresponding to the sub-models output.

The process 200 includes a reporting job 222 generating performance measurement reports (e.g., emergency sub-model performance report 224 and non-emergent sub-model performance report 226) based on the compute dictionary and performance measurement of a configuration file 214. The configuration file 214 may be an object file that contains among other things, the metadata information, processing scripts, and output storage locations that facilitate the reporting job 222 to execute operations that may be required to retrieve/transform/merge/segregate the data identified in insight 208. For example, configuration file may include query parameters (e.g., query_params of code 708 of FIG. 7A) that point to the location of other objects that facilitate extracting data from the insight 208. For another example, the configuration file may include data parameters (e.g., data_params of code 714 of FIG. 7A) that point to objects that facilitate transforming the format of the extracted data to a reporting format. The configuration file 214 may also include one or more scripts that facilitate computing the performance measurements for the one or more sub-models.

As depicted, generating the performance measurement reports may also include reporting job ingesting observed data 220. Observed data 220 may be data stored in the data cluster 402 that represents the observed outcome that corresponds to the prediction. As such, observed data 220 may be the observed emergency and non-emergent hospital admissions for the same time periods that correspond to the emergency sub-model 204 and the inpatient prediction sub-models 206.

Figure 4:
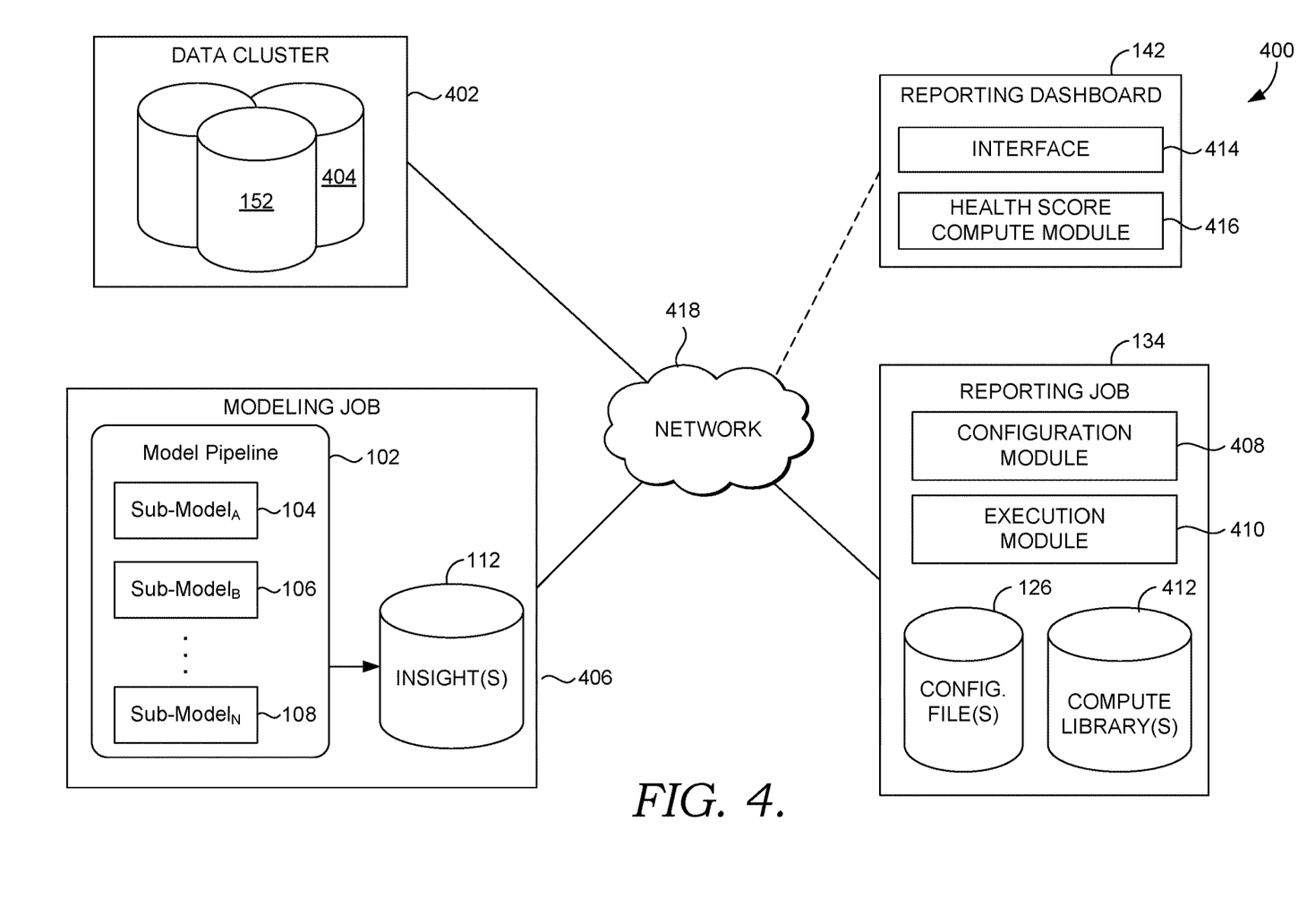
FIG. 4 depicts an example system environment that may facilitate computing sub-model performance measures, in accordance with some embodiments of the present disclosure.

Turning to FIG. 4, FIG. 4 depicts an example system environment 400, in accordance with embodiments described herein. The block components of system environment 400 comprises computing processes and/or components that may include any combination of hardware, firmware, and/or software. For example, system environment 400 may include one or more devices described in relation to computing environment 800 of FIG. 8.

As depicted in FIG. 4, system environment 400 includes one or more databases of a data cluster 402. The data cluster 402 may maintain structured and unstructured data in one or more relational databases (e.g., database 152 and database 404). The data may relate to any chaotic and/or dynamic system. For example, the data may comprise values, comments, records, and the like corresponding to a plurality of people. As the people interact with the one or more entities maintain the data cluster 402, additional data may be modified (e.g., added to, edited, removed, or in any other way manipulated) in the database 152 and/or database 404. For example, the data may be continuously, intermittently, and/or periodically modified as patients associated with the data are treated, seen, discharged, or otherwise interact with the institution, care network, or region that maintains the data cluster 402. The data may be generated by sensors that monitor the patient (e.g., heart rate and/or weight), data about the patient (e.g., admission date and/or demographics), and/or observations about the patient (e.g., diagnosis of disease or condition). The data at a first point in time may be used by a model pipeline (e.g., model pipeline 102) to predict an outcome at a future point in time. The data may then be modified as time proceeds from the first point in time to the future point in time. The data held in the data cluster 402 may, at the future time point, be used to determine an observed outcome corresponding to the earlier predicted outcome.

Figure 6:
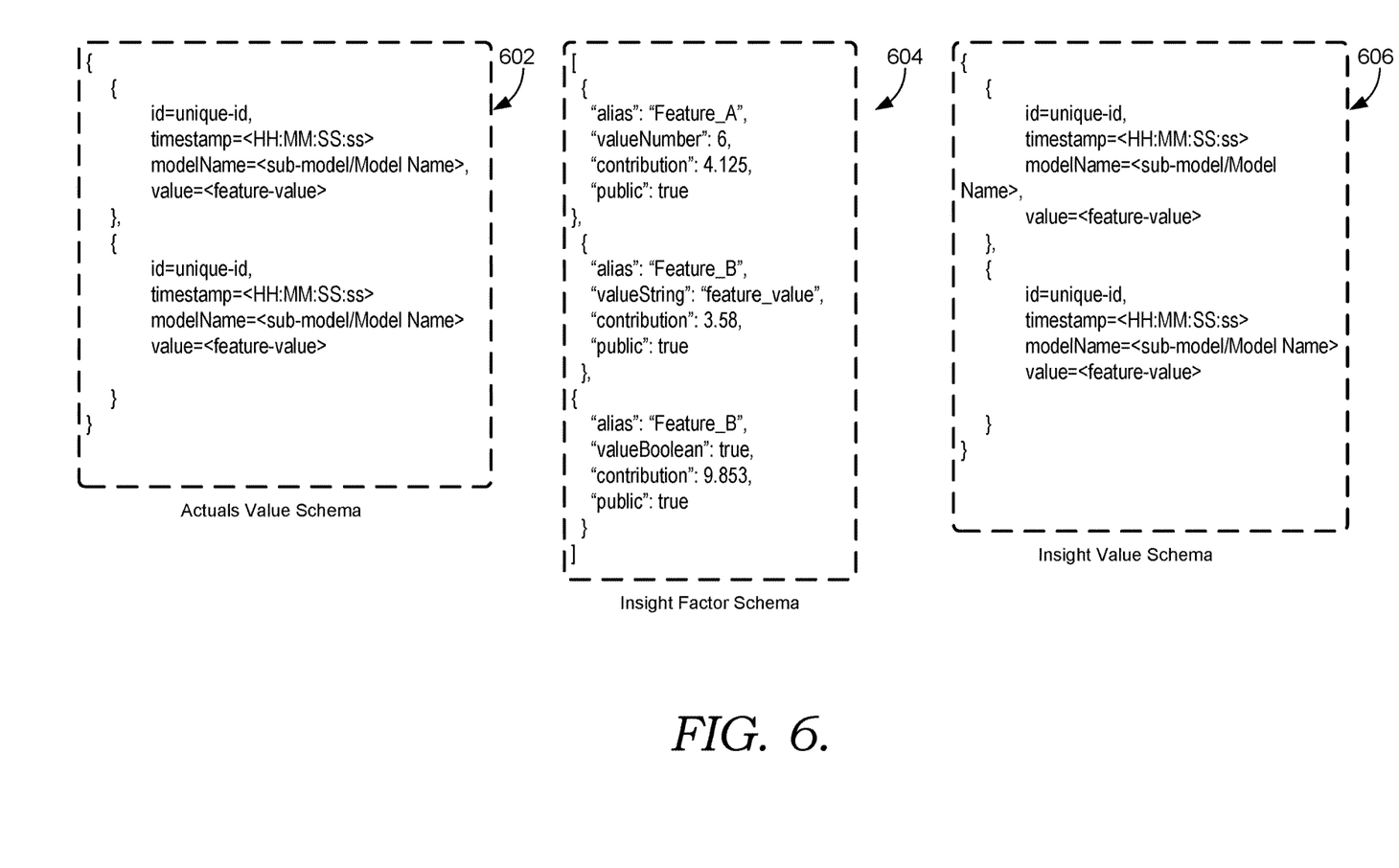
FIG. 6 depicts example code snippets for a sub-model insight, in accordance with some embodiments of the present disclosure.

The system environment 400 also includes a modeling job 406 including a model pipeline 102 and one or more sub-models. Modeling job 406 may include programmatic expressions that execute model pipeline 102 continuously, intermittently, and/or periodically. The modeling job 406 may also include programmatic expressions that generate one or more outputs corresponding to model pipeline 102. For example, the modeling job 406 may output one or more insights 112 in a database. In some embodiments, insight 112 are one or more object files (e.g., a JavaScript Object Notation file) that capture metadata related to the model pipeline 102, the one or more sub-models, and/or the observed data. For example, insight 112 may include expressions similar to those of observed insight expression 602, insight factor expression 604, and/or insight value expression 606, as depicted in FIG. 6. Notably, expressions 602, 604, and 606 are merely example insight expressions and not limiting.

Figure 7:
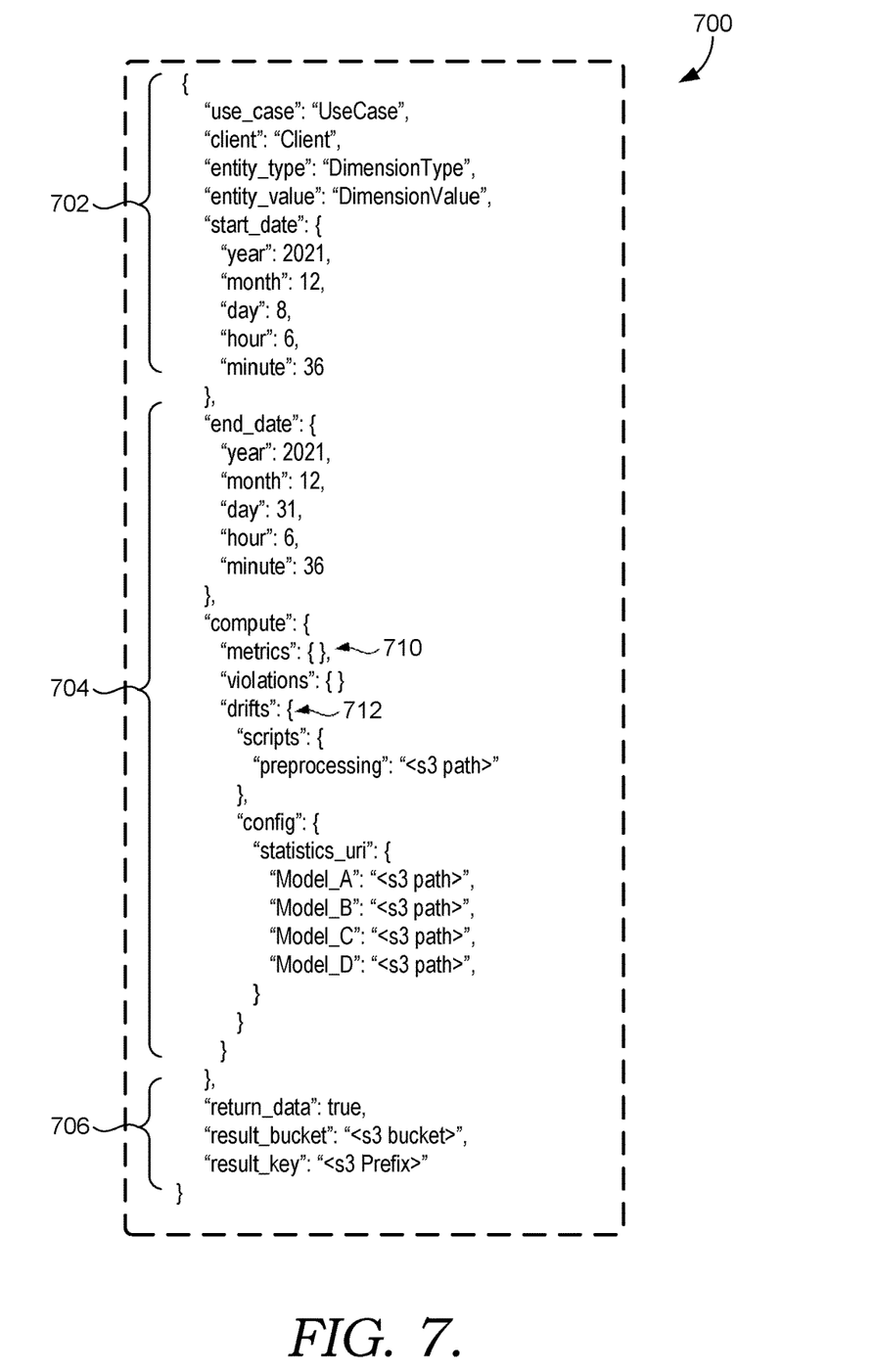
FIG. 7 depicts example code schema of a configuration file to facilitate computing sub-model performance measures, in accordance with some embodiments of the present disclosure.

The system environment 400 also includes a reporting job 134 including configuration module 408 and execution module 410. Reporting job 408 may include programmatic expressions that compute sub-model reports continuously, intermittently, and/or periodically. For example, the execution module 410 may be programed to activate configuration model 408 in response to output from model pipeline 102. Upon activation, configuration model 408 may access insight 112 and identify a configuration file 126 held in a database. In some embodiments, configuration file 126 is one or more object files (e.g., a JavaScript Object Notation file) that include object oriented expressions related to the model pipeline 102, the one or more sub-models, and/or one or more performance measures. For example, configuration file 126 may be in a data schema 700 such as is depicted in FIG. 7. The data schema 700 may include, among other things, include the metadata information (e.g., code 702), performance measurement(s) (e.g., code 704), and output storage locations (e.g., code 706) that facilitate the reporting job 134 to execute operations that may be required to retrieve/transform/merge/segregate the data identified in insight 112. As depicted in FIG. 7A, data schema 700 may include preconfigured performance measures. For example, data schema 700 may include one or more metric measures (e.g., code 710) that may include code such as example code 7010 that includes MAE metric measures. Similarly, data schema 700 may include one or more drift measures that may include code such as example code 7012 and/or example code 708. The data schema 700 may similarly include one or more violation measures and/or one or more bias measures. The reporting job 134 may also include compute library 412 that maintains computational rules and algorithms that may be called by one or more configuration files 126.

Figure 3:
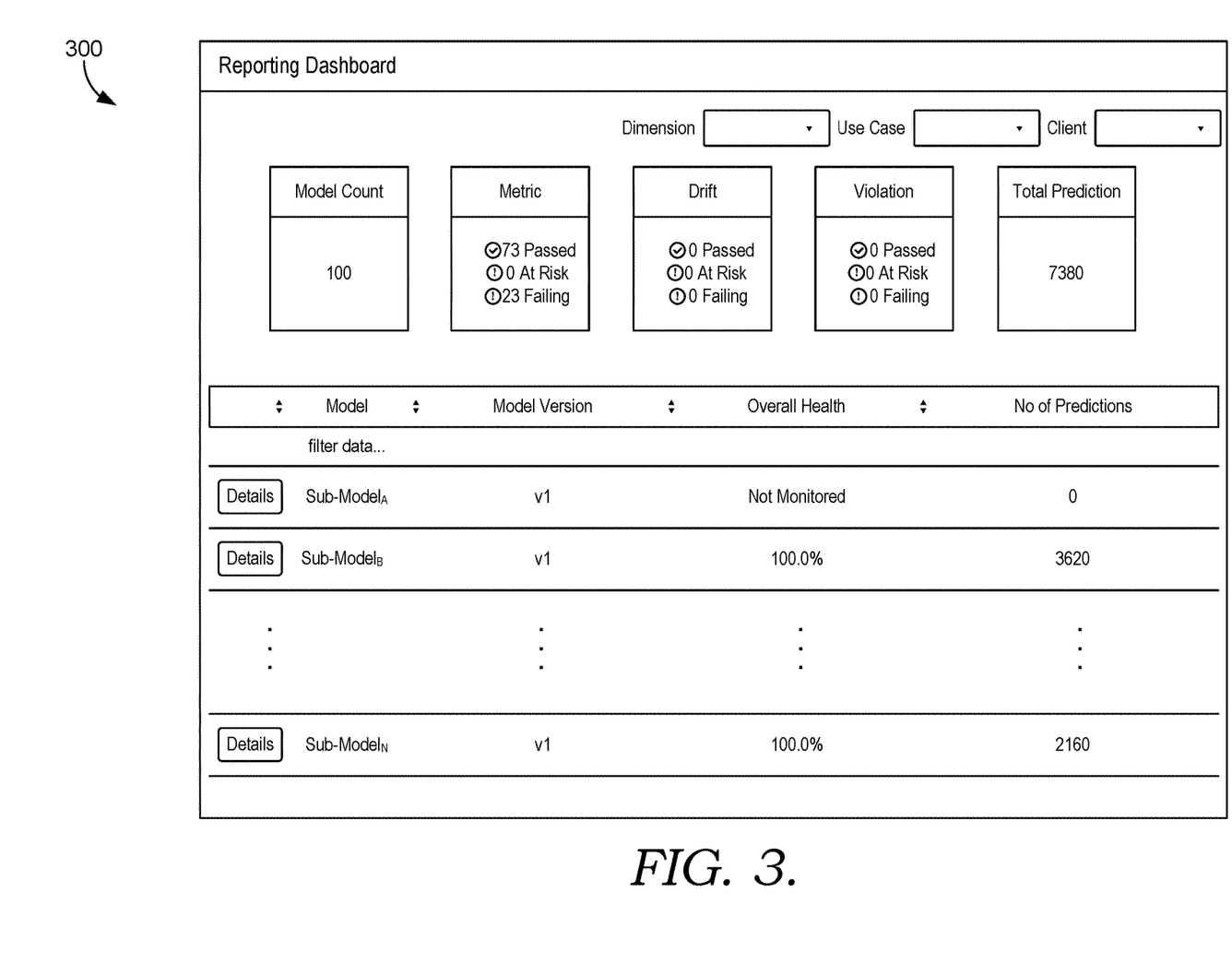
FIG. 3 depicts an example interface for displaying sub-model performance measures, in accordance with some embodiments of the present disclosure.

The system environment 400 also includes reporting dashboard 142 that facilitates the computation of sub-model health scores. The reporting dashboard 142 may include a user interface 414 that may facilitate an interactive presentation of the computed sub-model health scores (e.g., user interface 300). The reporting dashboard 142 may also include a health score computation module 416. The health score computation module 416 may include rules that facilitate a qualitative and/or quantitative assessment of the sub-model(s). For example, a sub-model may "pass" a first level score for where the values computed for the performance metric are below a maximum threshold and/or above a minimum threshold. Similarly, a sub-model may "fail" a first level score for where the values computed for the performance metric are above a maximum threshold or below a minimum threshold. Additionally, a sub-model may be classified as "at risk" for a first level score where the values computed for the performance metric are within a predetermined value of a baseline threshold.

The system environment 400 also includes a network 418. The network 418 may include wireless and/or physical (e.g., hardwired) connections. Exemplary networks include a telecommunications network of a service provider or carrier, Wide Area Network (WAN), a Local Area Network (LAN), a Wireless Local Area Network (WLAN), a cellular telecommunications network, a Wi-Fi network, a short range wireless network, a Wireless Metropolitan Area Network (WMAN), a Bluetooth® capable network, a fiber optic network, or a combination thereof. The network 418, generally, provides the components and devices access to the Internet and web-based applications.

Figure 5:
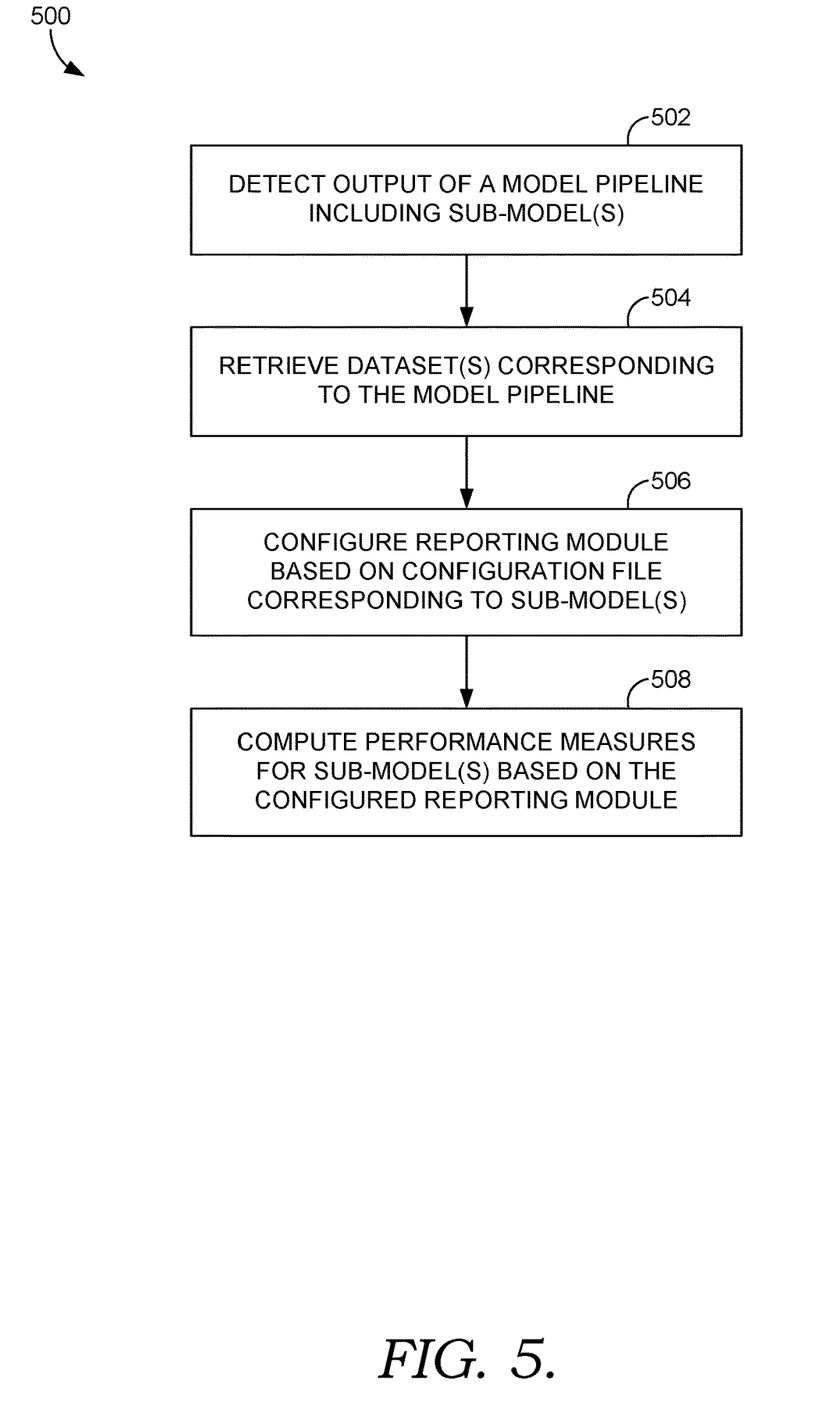
FIG. 5 is a block diagram of an example method for computing one or more sub-model performance measures, in accordance with some embodiments of the present disclosure.

Turning to FIG. 5, FIG. 5 depicts a method 500 for computing performance measures of sub-models, in accordance with embodiments described herein. Each block of method 500, described herein, comprises a computing process that may be performed using any combination of hardware, firmware, and/or software. For instance, various functions may be carried out by a processor executing instructions stored in memory. The method 500 may also be embodied as computer-usable instructions stored on computer storage media. The method 500 may be provided by a standalone application, a service or hosted service (standalone or in combination with another hosted service), or a plug-in to another product, to name a few. In addition, method 500 is described, by way of example, with respect to the process 100 of FIG. 1 or process 200 of FIG. 2. However, this method may additionally or alternatively be executed by any one system, or any combination of systems, including, but not limited to, those described herein.

The method 500, at block 502, includes detecting output of a model pipeline including one or more sub-models. For example, model pipeline 102 may output model pipeline prediction 110. Additionally, model pipeline 102 may output model insight 112. A reporting job 134 may detect the output of model pipeline prediction 110 or model insight 112. For another example, hospitalization model pipeline 202 may output insight 208. The reporting job 222 may detect the addition of insight 208 to a database or other data storage medium.

The method 500, at block 504, includes retrieving dataset (s) corresponding to the model pipeline. For example, in response to detecting output from the model pipeline 102, the reporting job 134 may retrieve insight 112. For another example, the reporting job 222 may retrieve insight 208.

At block 506, the method 500 includes configuring a reporting module based on a configuration file corresponding to the one or more sub-models. For example, reporting job 134 may load the configuration file 126 to facilitate configuration of a compute library and scripting data processing procedures for insight 112. For another example, reporting job 222 may load configuration file 214 to facilitate configuration of one or more emergency prediction sub-model performance measure compute library and scripting 216 and one or more inpatient prediction sub-model performance measure compute library and scripting 218.

The method 500, at block 508, includes computing performance measures for the one or more sub-model(s) based on the configured reporting module. For example, the reporting job 134 may execute one or more scripts in the configuration file 126 that compute sub-model$_A$ performance measure 128, sub-model$_B$ performance measure 130, and/or sub-model$_N$ performance measure 132. For another example, the reporting job 222 may use the script in configuration file 214 to generate emergency sub-model performance report 224 and/or non-emergent sub-model performance report 226.

Some embodiments of method 500 may also include generating a sub-model health score based on the computed performance measures. For example, the reporting dashboard 142 may consume the data of sub-model$_A$ performance measure report 136 and compute sub-model$_A$ health score 144. The reporting dashboard 142 may consume the data of sub-model$_B$ performance measure report 138 and compute sub-model$_B$ health score 146. The reporting dashboard 142 may consume the data of sub-model$_N$ performance measure report 140 and compute sub-model$_N$ health score 148. Additionally, For example, the reporting dashboard 142 may consume the data of sub-model$_A$ health score 144, sub-model$_B$ health score 146, and/or sub-model$_N$ health score 148 to compute a multi model health score 150.

Some embodiments of method 500 may also include comparative analysis of sub-model scores across multiple versions of the sub-model. For example, sub-model$_A$ health score 144, sub-model$_B$ health score 146, and/or sub-model$_N$ health score 148 to the health scores associated with other version of the sub-model$_A$, sub-model$_B$, and/or sub-model$_N$. Where the leading version of a sub-model is not included in a deployed model pipeline, some embodiments of method 500 can replace the deployed sub-model with the leading version of the sub-model. Because the leading model has demonstrated improved technological performance measures and/or improved prediction accuracy relative another model version (e.g., a currently in-use data model version) the leading sub-model may be deployed because it demonstrates improvement technological behavior and performance. The newly-deployed leading sub-data model version thus replaces another sub-model version that does not perform as well. Additionally or alternatively, the leading version can be used as input to retrain the corresponding data model, and to generate additional, updated version(s) the data model.

Figure 8:
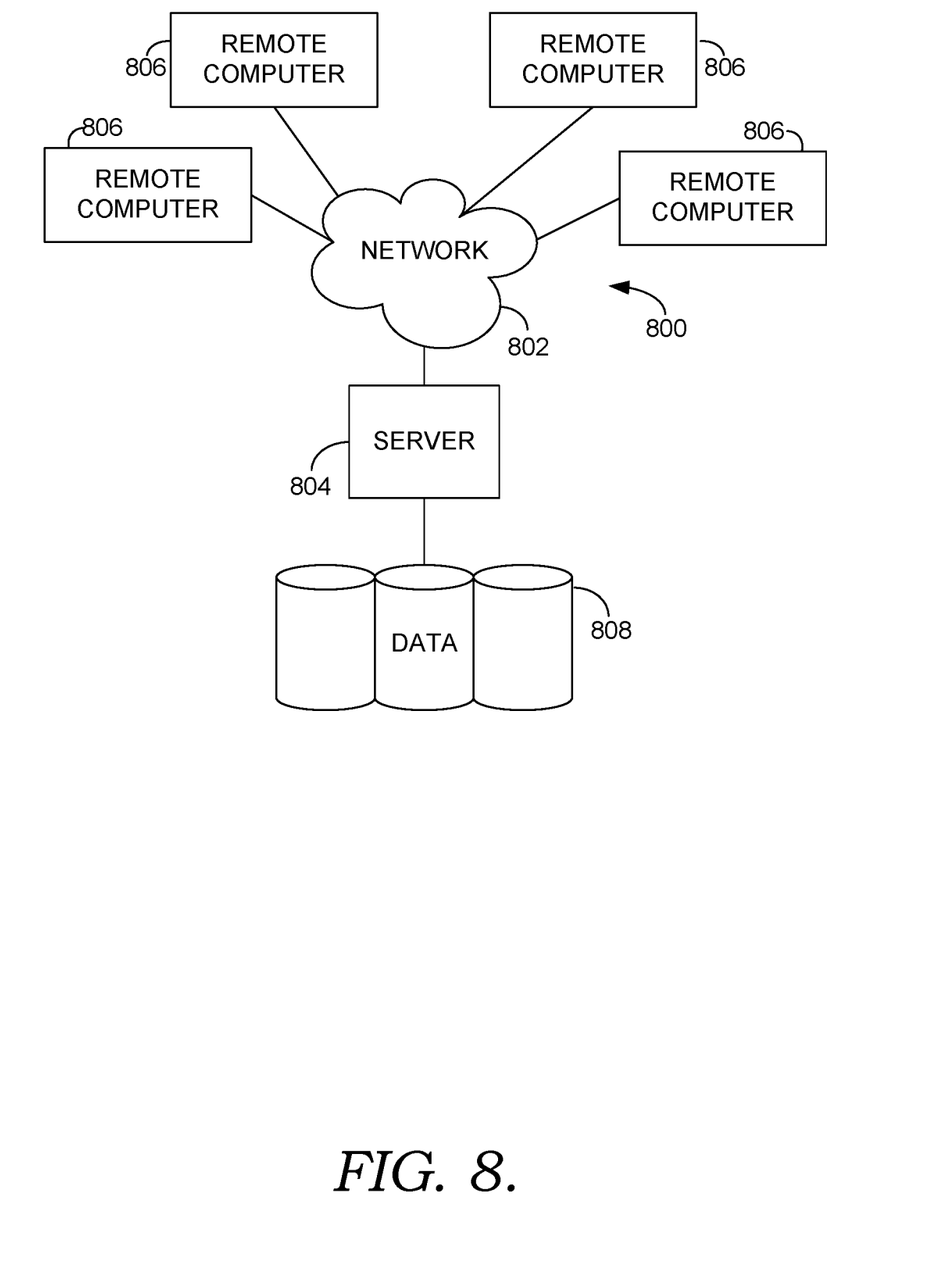
FIG. 8 is a block diagram of an example computing device suitable for use in implementing some embodiments of the present disclosure.

Beginning with FIG. 8, an exemplary computing environment is depicted, in accordance with an embodiment of the present invention. It will be understood by those of ordinary skill in the art that the example computing environment 800 is just one example of a suitable computing environment and is not intended to limit the scope of use or functionality of the present invention. Similarly, the computing environment 800 should not be interpreted as imputing any dependency and/or any requirements with regard to each component and combination(s) of components illustrated in FIG. 8. It will be appreciated by those having ordinary skill in the art that the connections illustrated in FIG. 8 are also exemplary as other methods, hardware, software, and devices for establishing a communications link between the components, devices, systems, and entities, as shown in FIG. 8, may be utilized in implementation of the present invention. Although the connections are depicted using one or more solid lines, it will be understood by those having ordinary skill in the art that the exemplary connections of FIG. 8 may be hardwired or wireless, and may use intermediary components that have been omitted or not included in FIG. 8 for simplicity's sake. As such, the absence of components from FIG. 8 should be not be interpreted as limiting the present invention to exclude additional components and combination(s) of components. Moreover, though devices and components are represented in FIG. 8 as singular devices and components, it will be appreciated that some embodiments may include a plurality of the devices and components such that FIG. 8 should not be considered as limiting the number of a device or component.

Continuing, the computing environment 800 of FIG. 8 is illustrated as being a distributed environment where components and devices may be remote from one another and may perform separate tasks. The components and devices may communicate with one another and may be linked to each other using a network 802. The network 802 may include wireless and/or physical (e.g., hardwired) connections. Exemplary networks include a telecommunications network of a service provider or carrier, Wide Area Network (WAN), a Local Area Network (LAN), a Wireless Local Area Network (WLAN), a cellular telecommunications network, a Wi-Fi network, a short range wireless network, a Wireless Metropolitan Area Network (WMAN), a Bluetooth® capable network, a fiber optic network, or a combination thereof. The network 802, generally, provides the components and devices access to the Internet and web-based applications.

The computing environment 800 comprises a computing device in the form of a server 804. Although illustrated as one component in FIG. 8, the present invention may utilize a plurality of local servers and/or remote servers in the computing environment 800. The server 804 may include components such as a processing unit, internal system memory, and a suitable system bus for coupling to various components, including a database or database cluster. In some embodiments, data cluster takes the form of a cloud-based data store, and in some embodiments is accessible by a cloud-based computing platform. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA®) local bus, and Peripheral Component Interconnect (PCI) bus, also known as Mezzanine bus.

The server 804 may include or may have access to computer-readable media. Computer-readable media can be any available media that may be accessed by server 804, and includes volatile and nonvolatile media, as well as removable and non-removable media. By way of example, and not limitation, computer-readable media may include computer storage media and communication media. Computer storage media may include, without limitation, volatile and non-volatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the server 804. Computer storage media does not comprise transitory signals per se.

Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

In embodiments, the server 804 uses logical connections to communicate with one or more remote computers 806 within the computing environment 800. In embodiments where the network 802 includes a wireless network, the server 804 may employ a modem to establish communications with the Internet, the server 804 may connect to the Internet using Wi-Fi or wireless access points, or the server may use a wireless network adapter to access the Internet. The server 804 engages in two-way communication with any or all of the components and devices illustrated in FIG. 8, using the network 802. Accordingly, the server 804 may send data to and receive data from the remote computers 806 over the network 802.

Although illustrated as a single device, the remote computers 806 may include multiple computing devices. In an embodiment having a distributed network, the remote computers 806 may be located at one or more different geographic locations. In an embodiment where the remote computers 806 is a plurality of computing devices, each of the plurality of computing devices may be located across various locations such as buildings in a campus, medical and research facilities at a medical complex, offices or "branches" of a banking/credit entity, or may be mobile devices that are wearable or carried by personnel, or attached to vehicles or trackable items in a warehouse, for example.

In some embodiments, the remote computers 806 is physically located in a medical setting such as, for example, a laboratory, inpatient room, an outpatient room, a hospital, a medical vehicle, a veterinary environment, an ambulatory setting, a medical billing office, a financial or administrative office, hospital administration setting, an in-home medical care environment, and/or medical professionals' offices. By way of example, a medical professional may include physicians; medical specialists such as surgeons, radiologists, cardiologists, and oncologists; emergency medical technicians; physicians' assistants; nurse practitioners; nurses; nurses' aides; pharmacists; dieticians; microbiologists; laboratory experts; genetic counselors; researchers; veterinarians; students; and the like. In other embodiments, the remote computers 806 may be physically located in a non-medical setting, such as a packing and shipping facility or deployed within a fleet of delivery or courier vehicles.

Continuing, the computing environment 800 includes a data store 808. Although shown as a single component, the data store 808 may be implemented using multiple data stores that are communicatively coupled to one another, independent of the geographic or physical location of a memory device. Exemplary data stores may store data in the form of artifacts, server lists, properties associated with servers, environments, properties associated with environments, computer instructions encoded in multiple different computer programming languages, deployment scripts, applications, properties associated with applications, release packages, version information for release packages, build levels associated with applications, identifiers for applications, identifiers for release packages, users, roles associated with users, permissions associated with roles, workflows and steps in the workflows, clients, servers associated with clients, attributes associated with properties, audit information, and/or audit trails for workflows. Exemplary data stores may also store data in the form of electronic records, for example, electronic medical records of patients, transaction records, billing records, task and workflow records, chronological event records, and the like.

Generally, the data store 808 includes physical memory that is configured to store information encoded in data. For example, the data store 808 may provide storage for computer-readable instructions, computer-executable instructions, data structures, data arrays, computer programs, applications, and other data that supports the functions and action to be undertaken using the computing environment 800 and components shown in exemplary FIG. 8.

In a computing environment having distributed components that are communicatively coupled via the network 802, program modules may be located in local and/or remote computer storage media including, for example only, memory storage devices. Embodiments of the present invention may be described in the context of computer-executable instructions, such as program modules, being executed by a computing device. Program modules may include, but are not limited to, routines, programs, objects, components, and data structures that perform particular tasks or implement particular abstract data types. In embodiments, the server 804 may access, retrieve, communicate, receive, and update information stored in the data store 808, including program modules. Accordingly, the server 804 may execute, using a processor, computer instructions stored in the data store 808 in order to perform embodiments described herein.

Although internal components of the devices in FIG. 8, such as the server 804, are not illustrated, those of ordinary skill in the art will appreciate that internal components and their interconnection are present in the devices of FIG. 8. Accordingly, additional details concerning the internal construction device are not further disclosed herein.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. One or more non-transitory media having instructions that, when executed by one or more processors, cause the one or more processors to facilitate a plurality of operations for evaluating and improving model version performance and accuracy, the operations comprising:
    inputting healthcare data to a model pipeline that includes sub-models, wherein an output of one of the sub-models determines an input of another of the sub-models;
    detecting, as an output from the model pipeline in response to the inputted healthcare data, a model-pipeline prediction computed based on the sub-models;
    retrieving one or more files containing formatted datasets corresponding to the model pipeline, wherein at least one of the formatted datasets includes data used to generate the model-pipeline prediction;
    receiving a configuration file; and
    computing a plurality of sub-model performance reports (a) for a plurality of the sub-models, (b) from the formatted datasets, and (c) based on the configuration file, wherein the plurality of sub-model performance reports includes performance metrics determined for a corresponding version of the model pipeline.

2. The one or more non-transitory media of claim 1, wherein computing the sub-model performance reports comprises:
    identifying, from the configuration file, data subsets to extract from the formatted datasets; and extracting the data subsets from the formatted datasets, wherein each of the data subsets is extracted from one of the formatted datasets for the corresponding sub-model.

3. The one or more non-transitory media of claim 2, wherein computing the sub-model performance reports further comprises: identifying, from the configuration file, performance measures to calculate.

4. The one or more non-transitory media of claim 3, wherein computing the sub-model performance reports further comprises, for each of the sub-models, executing a script to initiate:
calculating the performance metrics based on the corresponding data subset; and
generating a sub-model performance report for the corresponding sub-model of the model pipeline.

5. The one or more non-transitory media of claim 1, wherein the configuration file includes object oriented programmatic expressions that identify compute functions corresponding to the performance metrics.

6. The one or more non-transitory media of claim 5, wherein the performance metrics include a metric of Measured Absolute Percentage Error (MAPE), Mean Absolute Error (MAE), or Root Mean Squared Error (RMSE) for one or more of the sub-models.

7. The one or more non-transitory media of claim 5, wherein the object oriented programmatic expressions include quantification operations for a weight or a representation of predictive data elements based on a corresponding measure of training data.

8. The one or more non-transitory media of claim 1, wherein the configuration file includes object oriented programmatic expressions that correspond to: quantification operations for unexpected or undocumented changes, to structure or semantics, of data that is consumed by a sub-model of the sub-models or generated by a sub-model of the sub-models.

9. The one or more non-transitory media of claim 1, further storing instructions which, when executed, facilitate performance of: consuming sub-model performance reports, and computing a first level score for each of the sub-models based on the sub-model performance reports and the configuration file.

10. The one or more non-transitory media of claim 9, further storing instructions which, when executed, facilitate performance of: computing a multi model health score for the model pipeline based on the first level score for each of the sub-models and the configuration file.

11. The one or more non-transitory media of claim 9, further storing instructions which, when executed, facilitate performance of: computing a second level score, for a sub-model of the sub-models, based on: a total number of performance measures passed for the sub-model and a total number of performance measures computed for the sub-model.

12. The one or more non-transitory media of claim 11, wherein the second level score is determined based on a comparison of the total number of performance measures passed for the sub-model to the total number of performance measures computed for the sub-model.

13. The one or more non-transitory media of claim 1, further storing instructions which, when executed, cause: generating a first level score for a sub-model of the sub-models based on the one or more files and based on a corresponding base line threshold.

14. The one or more non-transitory media of claim 1, further storing instructions which, when executed, cause: generating a second level score, for a sub-model of the sub-models, based on a total number of performance measures passed for the sub-model and based on a total number of performance measures computed for the sub-model.

15. The one or more non-transitory media of claim 1, further storing instructions which, when executed, cause: generating a second level score, for a sub-model of the sub-models, based on classes of performance measurement selected from a group comprising metric measurements, bias measurements, drift measurements, and violation measurements.

16. The one or more non-transitory media of claim 1, further storing instructions which, when executed, cause: computing individual sub-model performance measures selected from a group comprising metric measurements, bias measurements, drift measurements, and violation measurements.

17. The one or more non-transitory media of claim 1, further storing instructions which, when executed, cause: presenting, for each of the sub-models, a health summary identifying multiple classes of performance measures selected from a group comprising metric, drift, bias, and violation.

18. The one or more non-transitory media of claim 1, further storing instructions which, when executed, cause: deploying into the model pipeline a second version of a sub-model to replace a first version of the sub-model, the second version associated with a demonstrated improvement to a technological performance relative to the first version.

19. The one or more non-transitory media of claim 1, further storing instructions which, when executed, cause: deploying into the model pipeline a second version of a sub-model to replace a first version of the sub-model, the second version associated with a demonstrated improvement to a predictive accuracy relative to the first version.

20. The one or more non-transitory media of claim 1, further storing instructions which, when executed, cause:
determining, for each of the sub-models, a first level score of "pass" or "fail"; and
counting a total number of the determined "pass" first level scores.

21. The one or more non-transitory media of claim 1, wherein the detected model-pipeline prediction comprises healthcare information.

22. The one or more non-transitory media of claim 1, wherein the output of the one of the sub-models is input to the other of the sub-models.

23. The one or more non-transitory media of claim 1 or claim 22, wherein the one or more files comprise first data corresponding to the output of the one of the sub-models.

24. The one or more non-transitory media of claim 1 or claim 22, wherein the one or more files comprise first data corresponding to an input to the other of the sub-models.

25. A system having one or more processors configured to facilitate a plurality of operations for evaluating and improving model version performance and accuracy, the operations comprising:
inputting healthcare data to a model pipeline that includes sub-models, wherein an output of one of the sub-models determines an input of another of the sub-models;
detecting, as an output from the model pipeline in response to the inputted healthcare data, a model-pipeline prediction computed based on the sub-models;
retrieving one or more files containing formatted datasets corresponding to the model pipeline, wherein at least one of the formatted datasets includes data used to generate the model-pipeline prediction;

receiving a configuration file; and computing a plurality of sub-model performance reports (a) for a plurality of the sub-models, (b) from the formatted datasets, and (c) based on the configuration file, wherein the plurality of sub-model performance reports includes performance metrics determined for a corresponding version of the model pipeline.

26. The system of claim 25, wherein computing the sub-model performance reports comprises: identifying, from the configuration file, data subsets to extract from the formatted datasets; and extracting the data subsets from the formatted datasets, wherein each of the data subsets is extracted from one of the formatted datasets for the corresponding sub-model.

27. The system of claim 26, wherein computing the sub-model performance reports further comprises: (a) identifying, from the configuration file, performance measures to calculate and (b) for each of the sub-models, executing a script to initiate: calculating the performance metrics based on the corresponding data subset and generating a sub-model performance report for the corresponding sub-model of the model pipeline.

28. The system of claim 25, wherein the configuration file includes object oriented programmatic expressions that identify compute functions corresponding to the performance metrics, and wherein the performance metrics include a metric of Measured Absolute Percentage Error (MAPE), Mean Absolute Error (MAE), or Root Mean Squared Error (RMSE) for one or more of the sub-models.

29. The system of claim 25, wherein the configuration file includes object oriented programmatic expressions that correspond to: quantification operations for unexpected or undocumented changes, to structure or semantics, of data that is consumed by a sub-model of the sub-models or generated by a sub-model of the sub-models.

30. A method for evaluating and improving model version performance and accuracy, the method comprising:

inputting healthcare data to a model pipeline that includes sub-models, wherein an output of one of the sub-models determines an input of another of the sub-models;

detecting, as an output from the model pipeline in response to the inputted healthcare data, a model-pipeline prediction computed based on the sub-models;

retrieving one or more files containing formatted datasets corresponding to the model pipeline, wherein at least one of the formatted datasets includes data used to generate the model-pipeline prediction;

receiving a configuration file; and computing a plurality of sub-model performance reports (a) for a plurality of the sub-models, (b) from the formatted datasets, and (c) based on the configuration file, wherein the plurality of sub-model performance reports includes performance metrics determined for a corresponding version of the model pipeline.

31. The method of claim 30, wherein computing the sub-model performance reports comprises: identifying, from the configuration file, data subsets to extract from the formatted datasets; and extracting the data subsets from the formatted datasets, wherein each of the data subsets is extracted from one of the formatted datasets for the corresponding sub-model.

32. The method of claim 31, wherein computing the sub-model performance reports further comprises: (a) identifying, from the configuration file, performance measures to calculate and (b) for each of the sub-models, executing a script to initiate: calculating the performance metrics based on the corresponding data subset and generating a sub-model performance report for the corresponding sub-model of the model pipeline.

33. The method of claim 30, wherein the configuration file includes object oriented programmatic expressions that identify compute functions corresponding to the performance metrics, and wherein the performance metrics include a metric of Measured Absolute Percentage Error (MAPE), Mean Absolute Error (MAE), or Root Mean Squared Error (RMSE) for one or more of the sub-models.

34. The method of claim 30, wherein the configuration file includes object oriented programmatic expressions that correspond to: quantification operations for unexpected or undocumented changes, to structure or semantics, of data that is consumed by a sub-model of the sub-models or generated by a sub-model of the sub-models.

* * * * *